United States Patent
Nakamura et al.

(10) Patent No.: US 10,247,114 B2
(45) Date of Patent: Apr. 2, 2019

(54) EXHAUST GAS CONTROL SYSTEM FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Takashi Nakamura, Toyota (JP); Keiichi Myojo, Okazaki (JP); Yoshiyuki Shogenji, Toyota (JP); Noriyasu Kobashi, Hachioji (JP); Yuki Nose, Kasugai (JP); Eiji Ikuta, Obu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 91 days.

(21) Appl. No.: 15/628,810

(22) Filed: Jun. 21, 2017

(65) Prior Publication Data
US 2017/0370302 A1 Dec. 28, 2017

(30) Foreign Application Priority Data
Jun. 27, 2016 (JP) .................. 2016-126812

(51) Int. Cl.
*F02D 21/08* (2006.01)
*F02D 41/00* (2006.01)

(52) U.S. Cl.
CPC ......... *F02D 21/08* (2013.01); *F02D 41/0052* (2013.01); *F02D 41/0055* (2013.01)

(58) Field of Classification Search
CPC .......... F01N 11/007; F01N 2900/1602; F01N 2900/1402; F01N 2900/1404; F01N 3/0814; F01N 11/00; F01N 3/101; F01N 2550/02; F01N 2560/14; F01N 2900/0408; F01N 2900/04; F02D 41/1441; F02D 41/26; F02D 41/0295; F02D 2200/0802
USPC ............... 60/276, 277, 295, 299; 123/568.21
See application file for complete search history.

(56) References Cited

U.S. PATENT DOCUMENTS

| | | | |
|---|---|---|---|
| 5,661,971 A * | 9/1997 | Waschatz | F01N 3/2006 60/274 |
| 2010/0192543 A1* | 8/2010 | Fujiwara | F02D 41/0255 60/276 |
| 2011/0232269 A1* | 9/2011 | Inoue | F01N 11/007 60/276 |

(Continued)

FOREIGN PATENT DOCUMENTS

JP 2001-050082 A 2/2001

*Primary Examiner* — Marguerite McMahon
*Assistant Examiner* — Tea Holbrook
(74) *Attorney, Agent, or Firm* — Hunton Andrews Kurth LLP

(57) ABSTRACT

In the exhaust gas control system, the electronic control unit is configured to execute first air-fuel ratio control for controlling an air-fuel ratio of an air-fuel mixture in a part of cylinders to a lean air-fuel ratio and controlling an air-fuel ratio of an air-fuel mixture in the other part of the cylinders to a rich air-fuel ratio is executed. The electronic control unit is configured to execute second air-fuel ratio control to perform malfunction diagnosis. The electronic control unit is configured to execute second air-fuel ratio control when the execution of the first air-fuel ratio control is interrupted after the temperature of the three-way catalyst becomes equal to or higher than the diagnosis temperature.

6 Claims, 4 Drawing Sheets

(56) References Cited

U.S. PATENT DOCUMENTS

2012/0324864 A1* 12/2012 Krengel ............. F02D 41/1441
60/274

* cited by examiner

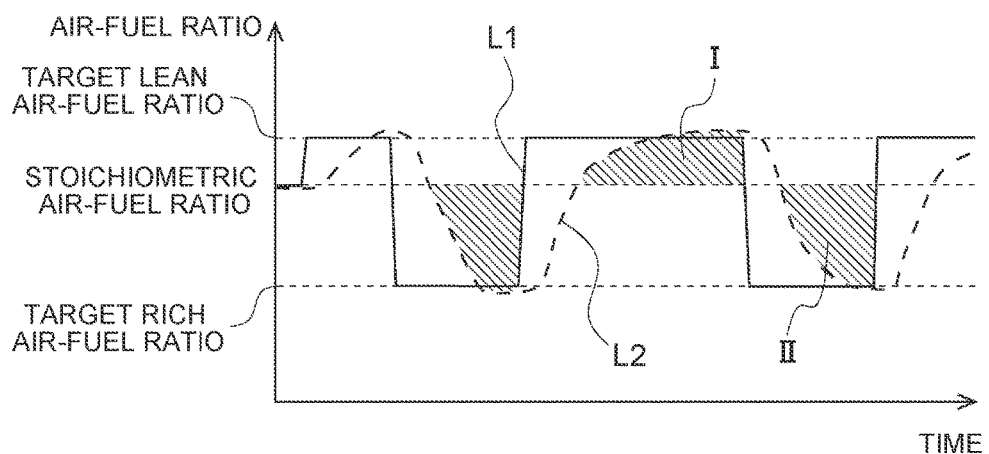
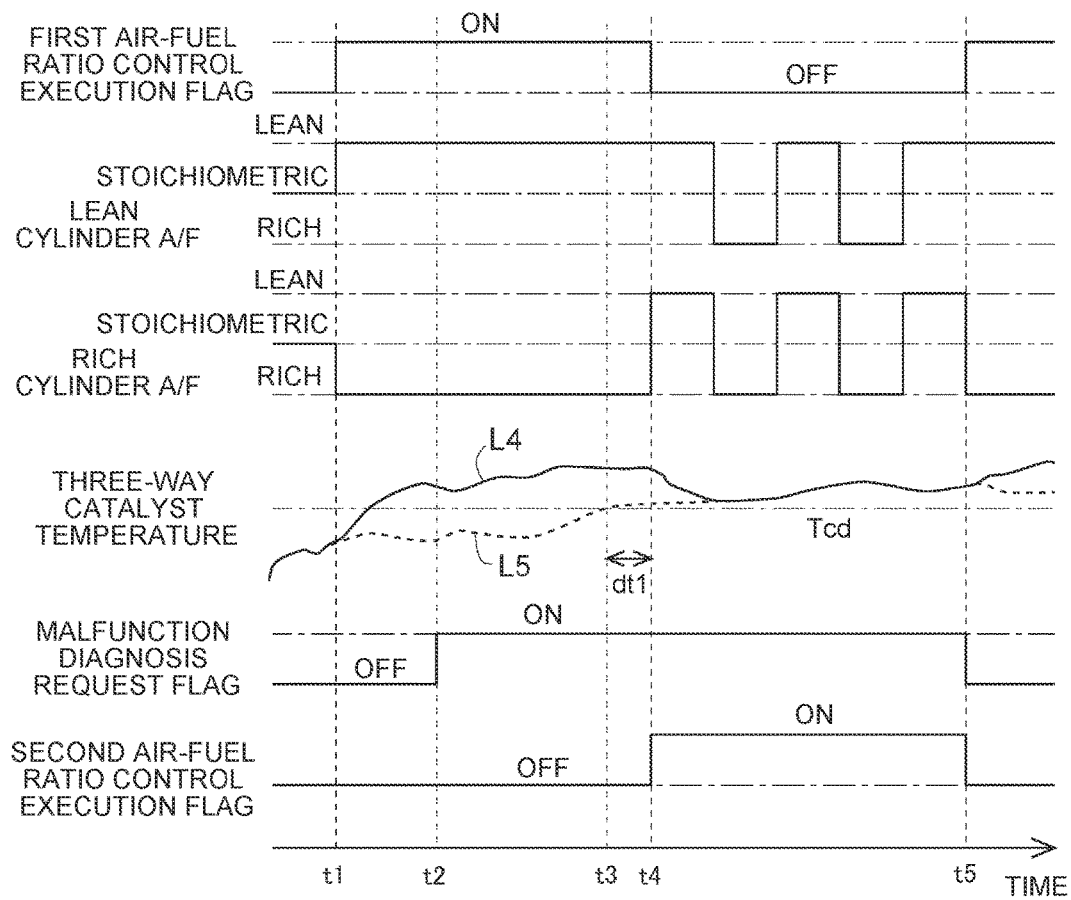

EXHAUST GAS CONTROL SYSTEM FOR INTERNAL COMBUSTION ENGINE AND CONTROL METHOD FOR INTERNAL COMBUSTION ENGINE

INCORPORATION BY REFERENCE

The disclosure of Japanese Patent Application No. 2016-126812 filed on Jun. 27, 2016 including the specification, drawings and abstract is incorporated herein by reference in its entirety.

BACKGROUND

1. Technical Field

The present disclosure relates to an exhaust gas control system for an internal combustion engine and a control method for an internal combustion engine.

2. Description of Related Art

In an exhaust gas control system for an internal combustion engine including a three-way catalyst provided in an exhaust passage, a technique for controlling an air-fuel ratio for each cylinder of the internal combustion engine in order to increase the temperature of the three-way catalyst is known. In air-fuel ratio control for increasing the catalyst temperature, an air-fuel ratio of an air-fuel mixture in a part of the cylinders is controlled to a lean air-fuel ratio leaner than a stoichiometric air-fuel ratio, and an air-fuel ratio of an air-fuel mixture in the other part of the cylinders is controlled to a rich air-fuel ratio richer than the stoichiometric air-fuel ratio. Hereinafter, the air-fuel ratio control for increasing the catalyst temperature is referred to as "first air-fuel ratio control". The cylinders in which the air-fuel ratio of the air-fuel mixture in the first air-fuel ratio control is controlled to the lean air-fuel ratio are referred to as "lean cylinders". The cylinders in which the air-fuel ratio of the air-fuel mixture is controlled to the rich air-fuel ratio in the first air-fuel ratio control are referred to as "rich cylinders".

When the first air-fuel ratio control is executed, a period in which exhaust gas discharged from the lean cylinders primarily flows into the three-way catalyst and a period in which exhaust gas discharged from the rich cylinders primarily flows into the three-way catalyst are alternately repeated. That is, exhaust gas of the lean air-fuel ratio and exhaust gas of the rich air-fuel ratio are alternately supplied to the three-way catalyst. At this time, when exhaust gas of the lean air-fuel ratio is supplied to the three-way catalyst, oxygen in exhaust gas is stored in the three-way catalyst. Then, when exhaust gas of the rich air-fuel ratio is supplied to the three-way catalyst, HC and CO in exhaust gas are oxidized by oxygen stored in the three-way catalyst. An increase in temperature of the three-way catalyst is promoted by heat of oxidation of HC and CO in this situation. Meanwhile, even if the first air-fuel ratio control is being executed, HC and CO in the three-way catalyst are oxidized and NOx in exhaust gas is reduced. That is, according to the first air-fuel ratio control, it is possible to promote an increase in temperature of the three-way catalyst while exhibiting not only an HC and CO oxidation function in the three-way catalyst but also an NOx reduction function.

Japanese Patent Application Publication No. 2001-050082 (JP 2001-050082 A) discloses a technique for performing air-fuel ratio control for each cylinder like the above-described first air-fuel ratio control. The technique disclosed in JP 2001-050082 A is a technique for performing feedback control of an air-fuel ratio of an air-fuel mixture in lean cylinders and an air-fuel ratio of an air-fuel mixture in rich cylinders based on a detection value of an air-fuel ratio sensor provided in an exhaust passage on an upstream side from a three-way catalyst.

SUMMARY

In the exhaust gas control system for an internal combustion engine in which the above-described first air-fuel ratio control is executed, sensors which detect physical quantities correlated with an air-fuel ratio of exhaust gas are respectively provided in an exhaust passage on an upstream side from the three-way catalyst and an exhaust passage on a downstream side from the three-way catalyst. Here, the sensor provided in the exhaust passage on the upstream side from the three-way catalyst is referred to as an "upstream sensor", and the sensor provided in the exhaust passage on the downstream side from the three-way catalyst is referred to as a "downstream sensor". In the exhaust gas control system having such a configuration, malfunction diagnosis for diagnosing the three-way catalyst, the upstream sensor, or the downstream sensor is performed.

When the above-described malfunction diagnosis is performed, air-fuel ratio control different from the first air-fuel ratio control is executed when the temperature of the three-way catalyst is equal to or higher than a predetermined diagnosis temperature. That is, air-fuel ratio control for switching the air-fuel ratio of the air-fuel mixture in all of a plurality of cylinders of the internal combustion engine between the lean air-fuel ratio leaner than the stoichiometric air-fuel ratio and the rich air-fuel ratio richer than the stoichiometric air-fuel ratio is executed. Hereinafter, such air-fuel ratio control for malfunction diagnosis is referred to as "second air-fuel ratio control". Then, malfunction diagnosis of the three-way catalyst, the upstream sensor, or the downstream sensor is performed based on a way of transition of the detection value of the upstream sensor or the downstream sensor when the second air-fuel ratio control is executed.

In a case where there is a request for malfunction diagnosis described above while the first air-fuel ratio control is being executed, it is necessary to execute the second air-fuel ratio control after interrupting the execution of the first air-fuel ratio control. The disclosure provides an exhaust gas control system for an internal combustion engine and a control method for an internal combustion engine capable of more suitably executing malfunction diagnosis for diagnosing a three-way catalyst, an upstream sensor, or a downstream sensor in such a case.

A first aspect of the disclosure is an exhaust gas control system for an internal combustion engine having a plurality of cylinders. The exhaust gas control system includes a three-way catalyst, an upstream sensor, a downstream sensor, and an electronic control unit. The three-way catalyst is provided in an exhaust passage on a downstream side from a collector of an exhaust branch pipes. The exhaust branch pipes are connected to the plurality of cylinders respectively. The upstream sensor is provided in the exhaust passage on an upstream side from the three-way catalyst. The upstream sensor is configured to detect a physical quantity correlated with an air-fuel ratio of exhaust gas. The downstream sensor is provided in the exhaust passage on a downstream side from the three-way catalyst. The downstream sensor is configured to detect a physical quantity correlated with the air-fuel ratio of exhaust gas. The electronic control unit is configured to execute first air-fuel ratio control. The electronic control unit is configured to control an air-fuel ratio of an air-fuel mixture in a part of the plurality of cylinders to a lean air-fuel ratio and control an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control. The lean air-fuel ratio is an air-fuel ratio that is leaner than a stoichiometric air-fuel ratio, and the rich air-fuel ratio is an air-fuel ratio that is richer than the stoichiometric air-fuel ratio. The electronic control unit is configured to execute malfunction diagnosis for diagnosing at least one of the three-way catalyst, the upstream sensor, and the downstream sensor. The electronic control unit is configured to execute second air-fuel ratio control to perform malfunction diagnosis. The electronic control unit is configured to switch the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control. The electronic control unit is configured to estimate a reference catalyst temperature while the electronic control unit executes the first air-fuel ratio control. The reference catalyst temperature is the temperature of the three-way catalyst not including an increase in temperature with the execution of the first air-fuel ratio control. The electronic control unit is configured to perform the malfunction diagnosis by executing the second air-fuel ratio control in response to the electronic control unit interrupts the execution of the first air-fuel ratio control after the estimated reference catalyst temperature becomes equal to or higher than the diagnosis temperature while the first air-fuel ratio control is being executed.

According to the above-described configuration, while the first air-fuel ratio control is being executed, the temperature of the three-way catalyst not including an increase in temperature with the execution of the first air-fuel ratio control is estimated. Then, the execution of the first air-fuel ratio control is interrupted after the estimated temperature becomes equal to or higher than the predetermined diagnosis temperature which is a threshold for the execution of the malfunction diagnosis, and the second air-fuel ratio control for the malfunction diagnosis is executed.

According to the above-described configuration, for the malfunction diagnosis for diagnosing the three-way catalyst, the upstream sensor, or the downstream sensor, the second air-fuel ratio control is executed when the temperature of the three-way catalyst is equal to or higher than the predetermined diagnosis temperature. The predetermined diagnosis temperature is a temperature at which the three-way catalyst in a normal state is sufficiently activated. Then, the second air-fuel ratio control is executed when the temperature of the three-way catalyst is equal to or higher than the diagnosis temperature. With this, it is possible to perform the malfunction diagnosis of the three-way catalyst, the upstream sensor, or the downstream sensor based on a way of transition of the detection value of the upstream sensor or the downstream sensor when the second air-fuel ratio control is executed.

If the operation state of the internal combustion engine is identical, when the first air-fuel ratio control is executed, the temperature of the three-way catalyst increases compared to when the first air-fuel ratio control is not executed. For this reason, when the execution of the first air-fuel ratio control is interrupted in order to execute the second air-fuel ratio control for the malfunction diagnosis while the first air-fuel ratio control is being executed, the temperature of the three-way catalyst decreases after the interruption. Accordingly, even when an actual temperature (that is, a temperature including an increase in temperature with the execution of the first air-fuel ratio control) of the three-way catalyst reaches the diagnosis temperature while the first air-fuel ratio control is being executed, when the execution of the first air-fuel ratio control is interrupted, the temperature of the three-way catalyst may decrease below the diagnosis temperature. In this case, it is not possible to perform malfunction diagnosis.

Accordingly, according to the above-described configuration, while the first air-fuel ratio control is being executed, the reference catalyst temperature which is the temperature (that is, a temperature in a case where it is assumed that the first air-fuel ratio control is not executed) of the three-way catalyst not including an increase in temperature with the execution of the first air-fuel ratio control is estimated. Then, the electronic control unit interrupts the execution of the first air-fuel ratio control after the estimated reference catalyst temperature becomes equal to or higher than the diagnosis temperature and executes the second air-fuel ratio control.

Accordingly, it is possible to prevent the temperature of the three-way catalyst from decreasing below the diagnosis temperature after the execution of the first air-fuel ratio control is interrupted. For this reason, in a case where there is a request for the malfunction diagnosis while the first air-fuel ratio control is being executed, it is possible to more suitably execute the malfunction diagnosis.

In the above-described exhaust gas control system, the electronic control unit may be configured to perform the malfunction diagnosis by executing the second air-fuel ratio control in response to the electronic control unit interrupts the execution of the first air-fuel ratio control after a state in which the estimated reference catalyst temperature is equal to or higher than the diagnosis temperature is continued for a first predetermined period or longer. The first predetermined period is a period in which it can be determined that the reference catalyst temperature of the three-way catalyst is stable and becomes equal to or higher than the diagnosis temperature. In this way, the execution of the first air-fuel ratio control is interrupted after the state in which the reference catalyst temperature of the three-way catalyst is equal to or higher than the diagnosis temperature is continued for the first predetermined period or longer, whereby it is possible to prevent the temperature of the three-way catalyst from decreasing below the diagnosis temperature with a high probability after the execution of the first air-fuel ratio control is interrupted.

A second aspect of the disclosure is an exhaust gas control system for an internal combustion engine having a plurality of cylinders. The exhaust gas control system includes a three-way catalyst, an upstream sensor, a downstream sensor, and an electronic control unit. The three-way catalyst is provided in an exhaust passage on a downstream side from a collector of exhaust branch pipes. The exhaust branch pipes are connected to the plurality of cylinders respectively. The upstream sensor is provided in the exhaust passage on an upstream side from the three-way catalyst. The upstream sensor is configured to detect a physical quantity correlated to an air-fuel ratio of exhaust gas. The downstream sensor is provided in the exhaust passage on a downstream side from the three-way catalyst. The downstream sensor is configured to detect a physical quantity correlated to the air-fuel ratio of exhaust gas. The electronic control unit is configured to execute first air-fuel ratio control. The electronic control unit is configured to control an air-fuel ratio of an air-fuel mixture in a part of the plurality of cylinders to a lean air-fuel ratio and control an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control. The the lean air-fuel ratio being an air-fuel ratio that is leaner than a stoichiometric air-fuel ratio, and the rich air-fuel ratio being an air-fuel ratio that is richer than the stoichiometric air-fuel ratio. The electronic control unit is configured to execute malfunction diagnosis for diagnosing at least one of the three-way catalyst, the upstream sensor, and the downstream sensor. The electronic control unit is configured to execute second air-fuel ratio control to perform the malfunction diagnosis. The electronic control unit is configured to switch the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control. The electronic control unit is configured to perform the malfunction diagnosis by executing the second air-fuel ratio control in response to the electronic control unit interrupts the execution of the first air-fuel ratio control after the temperature of the three-way catalyst becomes equal to or higher than a predetermined interruption temperature while the first air-fuel ratio control is being executed. The interruption temperature is a temperature higher than the diagnosis temperature and is a temperature at which the temperature of the three-way catalyst is maintained to be equal to or higher than the diagnosis temperature even when the electronic control unit interrupt the execution of the first air-fuel ratio control.

According to the above-described configuration, the execution of the first air-fuel ratio control is interrupted after the temperature (actual temperature) of the three-way catalyst becomes equal to or higher than the predetermined interruption temperature which is higher than the predetermined diagnosis temperature as a threshold for the execution of the malfunction diagnosis while the first air-fuel ratio control is being executed, and the second air-fuel ratio control for the malfunction diagnosis is executed.

According to the above-described configuration, as in the above-described first aspect, it is possible to prevent the temperature of the three-way catalyst from decreasing below the diagnosis temperature after the execution of the first air-fuel ratio control is interrupted. For this reason, in a case where there is a request for the malfunction diagnosis while the first air-fuel ratio control is being executed, it is possible to more suitably execute the malfunction diagnosis.

In the second aspect, the electronic control unit may be configured to perform the malfunction diagnosis by executing the second air-fuel ratio control in response to the electronic control unit interrupts the execution of the first air-fuel ratio control after a state in which the temperature of the three-way catalyst is equal to or higher than the interruption temperature while the first air-fuel ratio control is being executed is continued for a second predetermined period or longer. The second predetermined period is a period in which it can be determined that the temperature of the three-way catalyst is stable and becomes equal to or higher than the interruption temperature while the first air-fuel ratio control being executed. In this way, the execution of the first air-fuel ratio control is interrupted after the state in which the temperature of the three-way catalyst is equal to or higher than the interruption temperature while the first air-fuel ratio control is being executed is continued for the second predetermined period or longer, it is possible to prevent the temperature of the three-way catalyst from decreasing below the diagnosis temperature with a high probability after the execution of the first air-fuel ratio control is interrupted.

A third aspect of the disclosure is a control method for an internal combustion engine. The internal combustion engine includes a plurality of cylinders and provided with an exhaust gas control system. The exhaust gas control system includes a three-way catalyst, an upstream sensor, a downstream sensor, and an electronic control unit. The three-way catalyst is provided in an exhaust passage on a downstream side from a collector of exhaust branch pipes. The exhaust branch pipes are connected to the plurality of cylinders respectively. The upstream sensor is provided in the exhaust passage on an upstream side from the three-way catalyst. The upstream sensor is configured to detect a physical quantity correlated with an air-fuel ratio of exhaust gas. The downstream sensor is provided in the exhaust passage on a downstream side from the three-way catalyst. The downstream sensor is configured to detect a physical quantity correlated with the air-fuel ratio of exhaust gas. The control method includes: executing, by the electronic control unit, first air-fuel ratio control; controlling, by the electronic control unit, an air-fuel ratio of an air-fuel mixture in a part of the plurality of cylinders to a lean air-fuel ratio and controlling, by the electronic control unit, an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control. The lean air-fuel ratio is an air-fuel ratio that is leaner than a stoichiometric air-fuel ratio, and the rich air-fuel ratio is an air-fuel ratio that is richer than the stoichiometric air-fuel ratio; performing, by the electronic control unit, malfunction diagnosis for diagnosing at least one of the three-way catalyst, the upstream sensor, and the downstream sensor the electronic control unit; executing, by the electronic control unit, second air-fuel ratio control to perform the malfunction diagnosis; switching, by the electronic control unit, the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control; estimating, by the electronic control unit, reference catalyst temperature while the electronic control unit executes the first air-fuel ratio control, the reference catalyst temperature being a temperature of the three-way catalyst not including an increase in temperature with the execution of the first air-fuel ratio control; and performing, by the electronic control unit, the malfunction diagnosis by executing the second air-fuel ratio control in response to the electronic control unit interrupts the execution of the first air-fuel ratio control after the estimated reference catalyst temperature becomes equal to or higher than the diagnosis temperature while the first air-fuel ratio control is being executed.

A fourth aspect of the disclosure is a control method for an internal combustion engine. The internal combustion engine includes a plurality of cylinders and provided with an exhaust gas control system. The exhaust gas control system includes a three-way catalyst, an upstream sensor, a downstream sensor, and an electronic control unit. The three-way catalyst is provided in an exhaust passage on a downstream side from a collector of exhaust branch pipes. The exhaust branch pipes are connected to the plurality of cylinders respectively. The upstream sensor is provided in the exhaust passage on an upstream side from the three-way catalyst. The upstream sensor is configured to detect a physical quantity correlated with an air-fuel ratio of exhaust gas. The downstream sensor is provided in the exhaust passage on a downstream side from the three-way catalyst. The downstream sensor is configured to detect a physical quantity correlated with the air-fuel ratio of exhaust gas. The control method includes: executing, by the electronic control unit, first air-fuel ratio control; controlling, by the electronic control unit, an air-fuel ratio of an air-fuel mixture in a part of the plurality of cylinders to a lean air-fuel ratio and controlling, by the electronic control unit, an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control, the lean air-fuel ratio being an air-fuel ratio that is leaner than a stoichiometric air-fuel ratio, and the rich air-fuel ratio being an air-fuel ratio that is richer than the stoichiometric air-fuel ratio; performing, by the electronic control unit, malfunction diagnosis for diagnosing at least one of the three-way catalyst, the upstream sensor, and the downstream sensor; executing, by the electronic control unit, second air-fuel ratio control to perform the malfunction diagnosis; switching, by the electronic control unit, the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control; and performing, by the electronic control unit, the malfunction diagnosis by executing the second air-fuel ratio control in response to the electronic control unit interrupts the execution of the first air-fuel ratio control after the temperature of the three-way catalyst becomes equal to or higher than a predetermined interruption temperature while the first air-fuel ratio control is being executed, the interruption temperature being a temperature higher than the diagnosis temperature and a temperature at which the temperature of the three-way catalyst is maintained to be equal to or higher than the diagnosis temperature even when the electronic control unit interrupts the execution of the first air-fuel ratio control.

According to the above-described configuration, in a case where there is a request for the malfunction diagnosis for diagnosing the three-way catalyst, the upstream sensor, or the downstream sensor while the first air-fuel ratio control is being executed, it is possible to more suitably execute the malfunction diagnosis.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a diagram illustrating a calculation method of a maximum oxygen storage amount of the three-way catalyst according to the embodiment;

FIG. 4 is a time chart showing transition of first air-fuel ratio control execution flag, an air-fuel ratio of an air-fuel mixture in a lean cylinder, an air-fuel ratio of an air-fuel mixture in a rich cylinder, the temperature of the three-way catalyst, an malfunction diagnosis request flag, and a second air-fuel ratio control execution flag in the embodiment in a case where there is a request for malfunction diagnosis of the three-way catalyst while first air-fuel ratio control is being executed;

DETAILED DESCRIPTION OF EMBODIMENTS

Hereinafter, a specific embodiment of the disclosure will be described based on the drawings. The dimensions, materials, shapes, relative arrangements, and the like of constituent parts described in the embodiments are not intended to limit the technical scope of the disclosure to these alone in particular as long as there are not specific statements.

Figure 1:
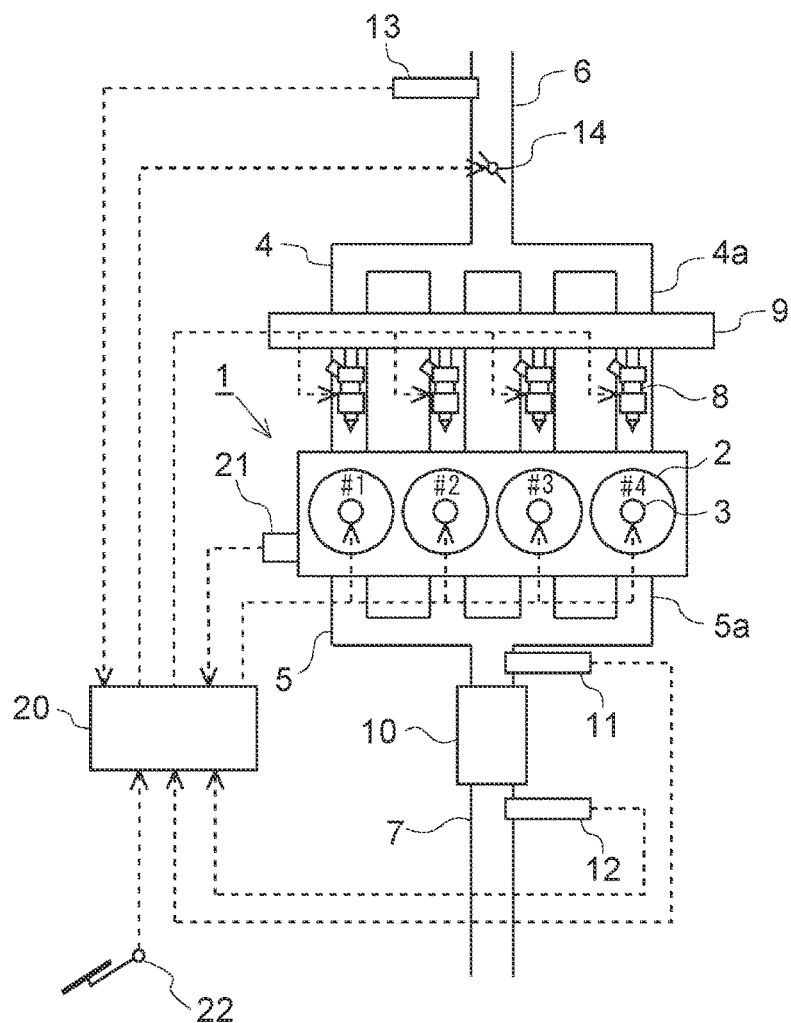
FIG. 1 is a diagram showing the schematic configuration of an internal combustion engine according to an embodiment and an intake and exhaust system thereof.

First, a first embodiment will be described. FIG. 1 is a diagram showing the schematic configuration of an internal combustion engine according to this embodiment and an intake and exhaust system thereof. An internal combustion engine 1 is a gasoline engine for vehicle drive. The internal combustion engine 1 is an in-line four-cylinder engine having four cylinders 2. Each cylinder 2 of the internal combustion engine 1 is provided with an ignition plug 3.

An intake manifold 4 and an exhaust manifold 5 are connected to the internal combustion engine 1. Then, each intake branch pipe 4a of the intake manifold 4 is connected to each cylinder 2. Each intake branch pipe 4a is provided with a fuel injection valve 8 which injects gasoline. Gasoline is supplied from a delivery pipe 9 to each fuel injection valve 8. The fuel injection valve 8 may directly inject fuel into the cylinder 2. A collector of the intake branch pipes 4a is connected to an intake passage 6. The intake passage 6 is provided with an air flowmeter 13 and a throttle valve 14. The air flowmeter 13 detects the amount of air (the amount of intake air) flowing into the internal combustion engine 1. The throttle valve 14 changes to a passage cross-sectional area of air in the intake passage 6 to adjust the amount of intake air of the internal combustion engine 1.

Each exhaust branch pipe 5a of the exhaust manifold 5 is connected to each cylinder 2. Then, a collector of the exhaust branch pipes 5a is connected to an exhaust passage 7. The exhaust passage 7 is provided with a three-way catalyst 10. An upstream air-fuel ratio sensor 11 is provided in the exhaust passage 7 on an upstream side from the three-way catalyst 10. A downstream air-fuel ratio sensor 12 is provided in the exhaust passage 7 on a downstream side from the three-way catalyst 10. An air-fuel ratio of exhaust gas (hereinafter, referred to as "inflow exhaust gas") flowing into the three-way catalyst 10 is detected by the upstream air-fuel ratio sensor 11. An air-fuel ratio of exhaust gas (hereinafter, referred to as "outflow exhaust gas") flowing out of the three-way catalyst 10 is detected by the downstream air-fuel ratio sensor 12. Instead of the upstream air-fuel ratio sensor 11, an O$_2$ sensor which detects an oxygen concentration of inflow exhaust gas may be provided. Instead of the downstream air-fuel ratio sensor 12, an O$_2$ sensor which detects an oxygen concentration of outflow exhaust gas may be provided.

The internal combustion engine 1 is also provided with an electronic control unit (ECU) 20. The ECU 20 is a unit which controls the operation state or the like of the internal combustion engine 1. The air flowmeter 13, the upstream air-fuel ratio sensor 11, and the downstream air-fuel ratio sensor 12 are electrically connected to the ECU 20. In addition, a crank angle sensor 21 and an accelerator pedal angle sensor 22 are electrically connected to the ECU 20. The crank angle sensor 21 detects a crank angle of the internal combustion engine 1. The accelerator pedal angle sensor 22 detects an accelerator pedal angle of a vehicle in which the internal combustion engine 1 is mounted. Then, output signals of the respective sensors are input to the ECU 20. The ECU 20 derives an engine rotation speed of the internal combustion engine 1 based on the output signal of the crank angle sensor 21. The ECU 20 derives an engine load of the internal combustion engine 1 based on the output signal of the accelerator pedal angle sensor 22. Furthermore, the throttle valve 14, each ignition plug 3, and each fuel injection valve 8 are electrically connected to the ECU 20. Then, these devices are controlled by the ECU 20. The internal combustion engine 1 is configured such that the fuel injection amount from the fuel injection valve 8 is changeable for each cylinder 2.

In this embodiment, the upstream air-fuel ratio sensor 11 is an example of an upstream sensor. In a case where an O$_2$ sensor is provided instead of the upstream air-fuel ratio sensor 11, the O$_2$ sensor is an example of an upstream sensor. In this embodiment, the downstream air-fuel ratio sensor 12 is an example of a downstream sensor. In a case where an O$_2$ sensor is provided instead of the downstream air-fuel ratio sensor 12, the O$_2$ sensor is an example of a downstream sensor.

In this embodiment, in a case where a predetermined temperature increase condition for increasing the temperature of the three-way catalyst 10 is established, the ECU 20 adjusts the fuel injection amount (that is, the injection amount from each fuel injection valve 8) in each cylinder 2 to execute first air-fuel ratio control. In the first air-fuel ratio control, the fuel injection amount in each cylinder 2 is adjusted, whereby an air-fuel ratio of an air-fuel mixture in part of the four cylinders 2 is controlled to a lean air-fuel ratio higher than a stoichiometric air-fuel ratio, and an air-fuel ratio of an air-fuel mixture in the other part of the four cylinders 2 is controlled to a rich air-fuel ratio lower than the stoichiometric air-fuel ratio. The cylinders in which the air-fuel ratio of the air-fuel mixture is controlled to the lean air-fuel ratio are referred to as "lean cylinders", and the cylinders in which the air-fuel ratio of the air-fuel mixture is controlled to the rich air-fuel ratio are referred to as "rich cylinders". In addition, in the first air-fuel ratio control, the air-fuel ratio of the air-fuel mixture in each of the lean cylinders and the rich cylinders is controlled such that an average value (hereinafter, referred to as an "average exhaust gas air-fuel ratio") of the air-fuel ratio of inflow exhaust gas becomes a predetermined target exhaust gas air-fuel ratio. Specifically, the fuel injection amount from the fuel injection valve 8 in each of the lean cylinders and the rich cylinders is controlled based on the detection values of the upstream air-fuel ratio sensor 11 and the downstream air-fuel ratio sensor 12.

If the first air-fuel ratio control is executed, exhaust gas of the lean air-fuel ratio and exhaust gas of the rich air-fuel ratio are alternately supplied to the three-way catalyst 10. At this time, when exhaust gas of the lean air-fuel ratio is supplied to the three-way catalyst 10, oxygen in exhaust gas is stored in the three-way catalyst 10. Then, when exhaust gas of the rich air-fuel ratio is supplied to the three-way catalyst 10, HC and CO in exhaust gas are oxidized by oxygen stored in the three-way catalyst 10. An increase in temperature of the three-way catalyst 10 is promoted by heat of oxidation of HC and CO at this time. Meanwhile, even if the first air-fuel ratio control is being executed, in the three-way catalyst 10, not only HC and CO are oxidized, but also NOx in exhaust gas is reduced. That is, according to the first air-fuel ratio control, it is possible to promote an increase in temperature of the three-way catalyst 10 while exhibiting not only an HC and CO oxidation function but also an NOx reduction function in the three-way catalyst 10.

In the first air-fuel ratio control, combustion in the lean cylinders and combustion in the rich cylinders are not necessarily alternately repeated for each cylinder. That is, the internal combustion engine 1 may be operated while setting a part of a plurality of cylinders 2 in the internal combustion engine 1 as lean cylinders and setting the other part of a plurality of cylinders 2 as rich cylinders. Furthermore, in the first air-fuel ratio control, cylinders which are set as lean cylinders and lean cylinders among the first cylinder to the fourth cylinder are determined in advance. At this time, the same cylinders may be constantly set as lean cylinders, and the same cylinders may be constantly set as rich cylinders. Each time the first air-fuel ratio control is executed, cylinders which are set as lean cylinders and cylinders which are set as rich cylinders may be changed. While the first air-fuel ratio control is being executed, cylinders which are set as lean cylinders and cylinders which are set as rich cylinders may be changed.

In this embodiment, the ECU 20 adjusts the fuel injection amount from the fuel injection valve 8 in each of the lean cylinders and the rich cylinders, thereby controlling the air-fuel ratio of the air-fuel mixture of the lean cylinders to the lean air-fuel ratio and the air-fuel ratio of the air-fuel mixture of the rich cylinders to the rich air-fuel ratio.

In this embodiment, malfunction diagnosis of the three-way catalyst 10 is performed by the ECU 20. In a case of performing the malfunction diagnosis of the three-way catalyst 10, when the temperature of the three-way catalyst 10 is equal to or higher than a predetermined diagnosis temperature, the ECU 20 executes second air-fuel ratio control for switching the air-fuel ratio of the air-fuel mixture in all cylinders 2 between the lean air-fuel ratio leaner than the stoichiometric air-fuel ratio and the rich air-fuel ratio richer than the stoichiometric air-fuel ratio. The predetermined diagnosis temperature is a temperature at which the three-way catalyst 10 in a normal state is sufficiently activated. Such a diagnosis temperature is determined in advance based on an experiment or the like.

Figure 2:
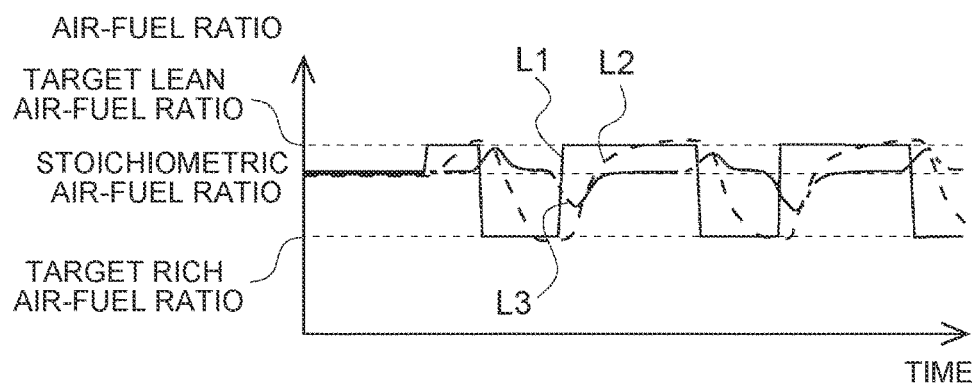
FIG. 2 is a time chart showing transition of an air-fuel ratio of an air-fuel mixture in a cylinder, a detection value of an upstream air-fuel ratio sensor, and a detection value of a downstream air-fuel ratio sensor according to the embodiment in a case of executing second air-fuel ratio control when the temperature of a three-way catalyst is equal to or higher than a predetermined diagnosis temperature.

FIG. 2 is a time chart showing transition of the air-fuel ratio of the air-fuel mixture in the cylinder 2 (the air-fuel ratio of the air-fuel mixture in all cylinders 2), the detection value of the upstream air-fuel ratio sensor 11, and the detection value of the downstream air-fuel ratio sensor 12 in a case where the second air-fuel ratio control is executed when the temperature of the three-way catalyst 10 is equal to or higher than the predetermined diagnosis temperature. In FIG. 2, a line L1 indicates transition of the air-fuel ratio of the air-fuel mixture in the cylinder 2, a line L2 indicates transition of the detection value of the upstream air-fuel ratio sensor 11, and a line L3 indicates transition of the detection value of the downstream air-fuel ratio sensor 12. FIG. 2 shows transition of the respective values when the three-way catalyst 10 is in the normal state.

In the second air-fuel ratio control, the fuel injection amounts from the fuel injection valves 8 of all cylinders 2 is adjusted, whereby the air-fuel ratio of the air-fuel mixture in all cylinders 2 is switched between a predetermined target lean air-fuel ratio and a predetermined target rich air-fuel ratio as shown in FIG. 2. Then, the air-fuel ratio of inflow exhaust gas and the air-fuel ratio of the outflow exhaust gas are varied with variation in the air-fuel ratio of the air-fuel mixture in the cylinder 2. For this reason, the detection value of the upstream air-fuel ratio sensor 11 and the detection value of the downstream air-fuel ratio sensor 12 are also varied.

At this time, as indicated by the line L2 of FIG. 2, if the air-fuel ratio of the air-fuel mixture in the cylinder 2 is switched to one of the target lean air-fuel ratio and the target rich air-fuel ratio to the other of the target lean air-fuel ratio and the target rich air-fuel ratio, the detection value of the upstream air-fuel ratio sensor 11 is changed from one of the lean air-fuel ratio and the rich air-fuel ratio to the other of the lean air-fuel ratio and the rich air-fuel ratio. As indicated by the line L3 of FIG. 2, even when the detection value of the upstream air-fuel ratio sensor 11 is changed from the lean air-fuel ratio to the rich air-fuel ratio, the detection value of the downstream air-fuel ratio sensor 12 is not immediately changed to the rich air-fuel ratio. That is, the detection value of the downstream air-fuel ratio sensor 12 is changed from the lean air-fuel ratio to a value near the stoichiometric air-fuel ratio once, is maintained at the value near the stoichiometric air-fuel ratio value for a certain period, and is then changed to the rich air-fuel ratio. Then, in the second air-fuel ratio control, at the timing at which the detection value of the downstream air-fuel ratio sensor 12 is changed to the rich air-fuel ratio, the air-fuel ratio of the air-fuel mixture in the cylinder 2 is switched from the target rich air-fuel ratio to the target lean air-fuel ratio.

As indicated by the line L3 of FIG. 2, even when the detection value of the upstream air-fuel ratio sensor 11 is changed from the rich air-fuel ratio to the lean air-fuel ratio, the detection value of the downstream air-fuel ratio sensor 12 is not immediately changed to the lean air-fuel ratio. That is, the detection value of the downstream air-fuel ratio sensor 12 is changed from the rich air-fuel ratio to a value near the stoichiometric air-fuel ratio, is maintained at the value near the stoichiometric air-fuel ratio for a certain period, and is then changed to the lean air-fuel ratio. Then, in the second air-fuel ratio control, at the timing at which the detection value of the downstream air-fuel ratio sensor 12 is changed to the lean air-fuel ratio, the air-fuel ratio of the air-fuel mixture in the cylinder 2 is switched from the target lean air-fuel ratio to the target rich air-fuel ratio.

As described above, when the second air-fuel ratio control is executed, the reason for the occurrence of the period in which detection value of the downstream air-fuel ratio sensor 12 is maintained at the value near the stoichiometric air-fuel ratio once in the middle of being changed from the lean air-fuel ratio to the rich air-fuel ratio and in the middle of being changed from the rich air-fuel ratio to the lean air-fuel ratio is because transition of the air-fuel ratio of outflow exhaust gas is affected by the oxygen storage ability of the three-way catalyst 10. That is, if the air-fuel ratio of inflow exhaust gas is switched from the lean air-fuel ratio to the rich air-fuel ratio, oxygen stored in the three-way catalyst 10 is emitted. For this reason, in this oxygen emission period, the air-fuel ratio of outflow exhaust gas is maintained near the stoichiometric air-fuel ratio. As a result, a period in which the detection value of the downstream air-fuel ratio sensor 12 is maintained at the value near the stoichiometric air-fuel ratio occurs. If the air-fuel ratio of inflow exhaust gas is switched from the rich air-fuel ratio to the lean air-fuel ratio, oxygen in exhaust gas is stored in the three-way catalyst 10. For this reason, in this oxygen storage period, the air-fuel ratio of outflow exhaust gas is maintained near the stoichiometric air-fuel ratio. As a result, a period in which the detection value of the downstream air-fuel ratio sensor 12 is maintained at the value near the stoichiometric air-fuel ratio occurs.

Then, an emitted oxygen amount from the three-way catalyst 10 in the oxygen emission period after the air-fuel ratio of inflow exhaust gas is switched from the lean air-fuel ratio to the rich air-fuel ratio and a stored oxygen amount in the three-way catalyst 10 in the oxygen storage period after the air-fuel ratio of inflow exhaust gas is switched from the rich air-fuel ratio to the lean air-fuel ratio are correlated with a maximum oxygen storage amount as the oxygen storage ability of the three-way catalyst 10. The maximum oxygen storage amount of the three-way catalyst 10 is correlated with the degree of deterioration of the three-way catalyst 10. That is, the higher the degree of deterioration of the three-way catalyst 10, the smaller the maximum oxygen storage amount of the three-way catalyst 10. Accordingly, the ECU 20 performs the malfunction diagnosis of the three-way catalyst 10 based on the maximum oxygen storage amount of the three-way catalyst 10.

A calculation method of the maximum oxygen storage amount of the three-way catalyst 10 will be described based on FIG. 3. FIG. 3 is a time chart showing transition the air-fuel ratio of the air-fuel mixture in the cylinder 2 (the air-fuel ratio of the air-fuel mixture in all cylinders 2) and the detection value of the upstream air-fuel ratio sensor 11 when the second air-fuel ratio control is executed when the temperature of the three-way catalyst 10 is equal to or higher than the predetermined diagnosis temperature. As in FIG. 2, in FIG. 3, a line L1 indicates transition of the air-fuel ratio of the air-fuel mixture in the cylinder 2, and a line L2 indicates transition of the detection value of the upstream air-fuel ratio sensor 11. At this time, during a period in which the air-fuel ratio of the air-fuel mixture in the cylinder 2 is the target lean air-fuel ratio, an integrated value of the difference between the detection value of the upstream air-fuel ratio sensor 11 and the stoichiometric air-fuel ratio, that is, an area of a region I shown in FIG. 3 is proportional to the stored oxygen amount in the three-way catalyst 10 during the period. During a period in which the air-fuel ratio of the air-fuel mixture in the cylinder 2 is the target rich air-fuel ratio, an integrated value of the difference between the detection value of the upstream air-fuel ratio sensor 11 and the stoichiometric air-fuel ratio, that is, an area of a region II shown in FIG. 3 is proportional to the emitted oxygen amount from the three-way catalyst 10 during the period. Accordingly, in this embodiment, when the second air-fuel ratio control is executed, the area of the region I shown in FIG. 3 and the area of the region II shown in FIG. 3 are repeatedly calculated a predetermined number of times, and the maximum oxygen storage amount of the three-way catalyst 10 is calculated based on an average value of the calculated values. Then, in the malfunction diagnosis of the three-way catalyst 10, when the maximum oxygen storage amount of the three-way catalyst 10 is smaller than a predetermined threshold, it is determined that the three-way catalyst 10 is in a malfunctioning state.

Even in a case where an $O_2$ sensor is provided instead of the downstream air-fuel ratio sensor 12, transition of a detection value of the $O_2$ sensor when the second air-fuel ratio control is executed when the temperature of the three-way catalyst 10 is equal to or higher than the predetermined diagnosis temperature is affected by the oxygen storage ability of the three-way catalyst 10. That is, a time lag correlated with the oxygen emission period occurs until the detection value of the $O_2$ sensor provided on the downstream side from the three-way catalyst 10 is switched from the lean air-fuel ratio to the rich air-fuel ratio after the air-fuel ratio of the air-fuel mixture in the cylinder 2 is switched from the lean air-fuel ratio to the rich air-fuel ratio. Furthermore, a time lag correlated with the oxygen storage period occurs until the detection value of the $O_2$ sensor provided on the downstream side from the three-way catalyst 10 is switched from the rich air-fuel ratio to the lean air-fuel ratio after the air-fuel ratio of the air-fuel mixture in the cylinder 2 is switched from the rich air-fuel ratio to the lean air-fuel ratio. For this reason, even in a case where an $O_2$ sensor is provided instead of the downstream air-fuel ratio sensor 12, it is possible to calculate the maximum oxygen storage amount of the three-way catalyst 10 based on an integrated value of the difference between the air-fuel ratio of the air-fuel mixture in the cylinder 2 and the detection value of the $O_2$ sensor when the second air-fuel ratio control is executed when the temperature of the three-way catalyst 10 is equal to or higher than the predetermined diagnosis temperature. Then, it is possible to perform the malfunction diagnosis of the three-way catalyst 10 based on the calculated maximum oxygen storage amount of the three-way catalyst 10.

In this embodiment, the ECU 20 switches the air-fuel ratio of the air-fuel mixture in all cylinders 2 between the predetermined target lean air-fuel ratio and the predetermined target rich air-fuel ratio to execute the second air-fuel ratio control, and performs the malfunction diagnosis of the three-way catalyst 10 based on the maximum oxygen storage amount of the three-way catalyst 10 calculated when second air-fuel ratio control is executed.

As described above, in a case of performing the malfunction diagnosis of the three-way catalyst 10, it is necessary to execute the second air-fuel ratio control which is air-fuel ratio control different from the first air-fuel ratio control. For this reason, in a case where there is a request for the malfunction diagnosis of the three-way catalyst 10 while the first air-fuel ratio control is being executed, it is necessary to interrupt the execution of the first air-fuel ratio control and to execute the second air-fuel ratio control. The second air-fuel ratio control for the malfunction diagnosis of the three-way catalyst 10 is executed when the temperature of the three-way catalyst 10 is equal to or higher than the diagnosis temperature. For this reason, even in a case of interrupting the execution of the first air-fuel ratio control and executing the second air-fuel ratio control, the temperature of the three-way catalyst 10 should be equal to or higher than the diagnosis temperature. However, if the operation state of the internal combustion engine 1 is identical, when the first air-fuel ratio control is executed, the temperature of the three-way catalyst 10 increases compared to when the first air-fuel ratio control is not executed. Accordingly, even if the temperature of the three-way catalyst 10 reaches the diagnosis temperature while the first air-fuel ratio control is being executed, if the execution of the first air-fuel ratio control is interrupted in order to execute the second air-fuel ratio control, the temperature of the three-way catalyst 10 decreases. As a result, if the temperature of the three-way catalyst 10 falls below the diagnosis temperature, it is not possible to perform the malfunction diagnosis of the three-way catalyst 10.

Accordingly, in this embodiment, the ECU 20 estimates a reference catalyst temperature which is the temperature of the three-way catalyst 10 (that is, a temperature in a case where it is assumed that the first air-fuel ratio control is not executed) not including an increase in temperature with the execution of the first air-fuel ratio control while the first air-fuel ratio control is being executed. The reference catalyst temperature can be estimated based on the operation state of the internal combustion engine 1. In a case where a temperature sensor which detects the temperature of inflow exhaust gas is provided in the exhaust passage 7 on the upstream side from the three-way catalyst 10, the reference catalyst temperature may be estimated based on the temperature of inflow exhaust gas detected by the temperature sensor. The ECU 20 constantly estimates the reference catalyst temperature not only while the first air-fuel ratio control is being executed but also while the internal combustion engine 1 is being operated. In this embodiment, the ECU 20 estimates the reference catalyst temperature. The ECU 20 estimates an increase in temperature of the three-way catalyst 10 with the execution of the first air-fuel ratio control in addition to the reference catalyst temperature while the first air-fuel ratio control is being executed, and estimates the current actual temperature of the three-way catalyst 10 (that is, the actual temperature of the three-way catalyst 10 while the first air-fuel ratio control is being executed) by adding the increase in temperature to the reference catalyst temperature. In a case where a temperature sensor which detects the temperature of outflow exhaust gas is provided in the exhaust passage 7 on the downstream side from the three-way catalyst 10, the actual temperature of the three-way catalyst 10 may be estimated based on the temperature of outflow exhaust gas detected by the temperature sensor.

Then, the ECU 20 interrupts the execution of the first air-fuel ratio control after the estimated reference catalyst temperature becomes equal to or higher than the diagnosis temperature, and executes the second air-fuel ratio control. Accordingly, it is possible to prevent the temperature of the three-way catalyst 10 from decreasing below the diagnosis temperature after the execution of the first air-fuel ratio control is interrupted. For this reason, in a case where there is a request for the malfunction diagnosis of the three-way catalyst 10 while the first air-fuel ratio control is being executed, it is possible to more suitably perform the malfunction diagnosis.

FIG. 4 is a time chart showing transition of a first air-fuel ratio control execution flag, an air-fuel ratio (lean cylinder A/F) of an air-fuel mixture in a lean cylinder, an air-fuel ratio (rich cylinder A/F) of an air-fuel mixture in a rich cylinder, the temperature of the three-way catalyst, an malfunction diagnosis request flag, and a second air-fuel ratio control execution flag in this embodiment in a case where there is a request for the malfunction diagnosis of the three-way catalyst 10 while the first air-fuel ratio control is being executed. The first air-fuel ratio control execution flag is a flag which is stored in the ECU 20, and a flag which is turned on when executing the first air-fuel ratio control. The malfunction diagnosis request flag is a flag which is stored in the ECU 20, and a flag which is turned on in a case where there is a request for the malfunction diagnosis of the three-way catalyst 10. "A case where there is a request for the malfunction diagnosis of the three-way catalyst 10" is, in other words, a case where conditions other than the temperature of the three-way catalyst 10 among execution conditions of the malfunction diagnosis of the three-way catalyst 10 are established. The second air-fuel ratio control execution flag is a flag which is stored in the ECU 20, and a flag which is turned on when executing the second air-fuel ratio control. A lean cylinder is a cylinder which becomes a lean cylinder when the first air-fuel ratio control is executed, and a rich cylinder is a cylinder which becomes a rich cylinder when the first air-fuel ratio control is executed. Accordingly, except when the first air-fuel ratio control is executed, in all of the lean cylinders and the rich cylinders, the air-fuel ratio of the air-fuel mixture transits in the same manner. In FIG. 4, a line L4 indicates transition of the actual temperature of the three-way catalyst 10, and a line L5 indicates transition of the reference catalyst temperature of the three-way catalyst 10.

In FIG. 4, at a time t1, the predetermined temperature increase condition is established to turn on the first air-fuel ratio control execution flag, and the execution of the first air-fuel ratio control is started. For this reason, the air-fuel ratio of the air-fuel mixture in the lean cylinder is controlled to the lean air-fuel ratio, and the air-fuel ratio of the air-fuel mixture in the rich cylinder is controlled to the rich air-fuel ratio. If the execution of the first air-fuel ratio control is started, as indicated by the line L4, the actual temperature of the three-way catalyst 10 increases.

Then, in FIG. 4, at a time t2, the malfunction diagnosis request flag is turned on. At the time t2, the actual temperature of the three-way catalyst 10 becomes equal to or higher than a diagnosis temperature Tcd. At the time t2, the reference catalyst temperature of the three-way catalyst 10 does not reach the diagnosis temperature Tcd. For this reason, at this time, the second air-fuel ratio control is not executed, and the execution of the first air-fuel ratio control is continued.

Then, if the temperature of exhaust gas discharged from the internal combustion engine 1 increases with change in the operation state of the internal combustion engine 1, the reference catalyst temperature of the three-way catalyst 10 also increases accordingly. As a result, in FIG. 4, at a time t3, the reference catalyst temperature of the three-way catalyst 10 reaches the diagnosis temperature Tcd. However, in this embodiment, at the time t3, the second air-fuel ratio control is not immediately executed, and the execution of the first air-fuel ratio control is continued. Then, if a state in which the reference catalyst temperature of the three-way catalyst 10 is equal to or higher than the diagnosis temperature Tcd is continued for a first predetermined period dt1 from the time t3, at a time t4, the first air-fuel ratio control execution flag is turned off and the second air-fuel ratio control execution flag is turned on. That is, at the time t4, the execution of the first air-fuel ratio control is interrupted, and the execution of the second air-fuel ratio control is started. For this reason, the air-fuel ratio of the air-fuel mixture in all cylinders (the lean cylinders and the rich cylinders) is controlled so as to be switched between the lean air-fuel ratio and the rich air-fuel ratio. The first predetermined period dt1 is a period in which it can be determined that the reference catalyst temperature of the three-way catalyst 10 is stable and becomes equal to or higher than the diagnosis temperature Tcd. The first predetermined period dt1 can be determined in advance based on an experiment or the like. The air-fuel ratio of the air-fuel mixture of the lean cylinders in the first air-fuel ratio control and the target lean air-fuel ratio in the second air-fuel ratio control are not necessarily the same. The air-fuel ratio of the air-fuel mixture of the rich cylinders in the first air-fuel ratio control and the target rich air-fuel ratio in the second air-fuel ratio control are not necessarily the same.

Then, after the time t4, while the second air-fuel ratio control is being executed, the maximum oxygen storage amount of the three-way catalyst 10 is calculated by the ECU 20 using the above-described method. The malfunction diagnosis of the three-way catalyst 10 based on the calculated maximum oxygen storage amount of the three-way catalyst 10 is performed by the ECU 20. If the malfunction diagnosis is completed, at a time t5, the malfunction diagnosis request flag and the second air-fuel ratio control execution flag are turned off. That is, the execution of the second air-fuel ratio control is stopped. Then, at the time t5, if the execution conditions of the first air-fuel ratio control are still established (that is, if there is a request to increase the temperature of the three-way catalyst 10), as shown in FIG. 4, at the time t5, the first air-fuel ratio control execution flag is turned on. That is, the execution of the first air-fuel ratio control is restarted from the time t5. At the time t5, if the execution conditions of the first air-fuel ratio control are unestablished (that is, if there is no request to increase the temperature of the three-way catalyst 10), even after the time t5, the first air-fuel ratio control execution flag is maintained to be turned off. In this case, in the internal combustion engine 1, normal air-fuel ratio control for controlling the air-fuel ratio of the air-fuel mixture to near the stoichiometric air-fuel ratio is executed.

Figure 5:
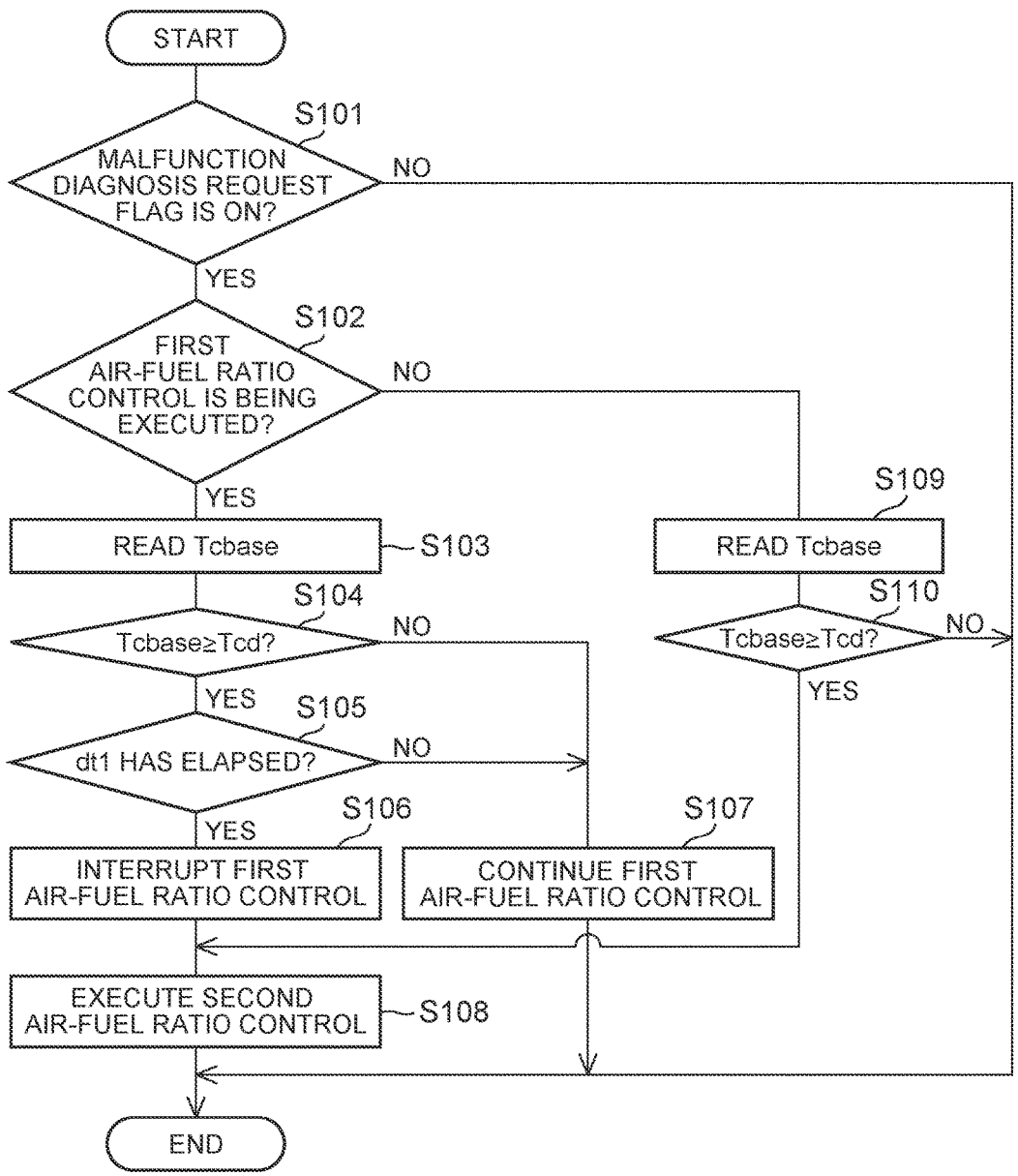
FIG. 5 is a flowchart showing a control flow when executing second air-fuel ratio control according to a first embodiment.

Hereinafter, a control flow when executing the second air-fuel ratio control according to this embodiment will be described based on the flowchart shown in FIG. 5. The flow shown in FIG. 5 is stored in the ECU 20, and is repeatedly executed in a predetermined cycle by the ECU 20 while the internal combustion engine 1 is being operated.

In this flow, first, in S101, it is determined whether or not the malfunction diagnosis request flag stored in the ECU 20 is turned on. In a case where the determination of S101 is negative, that is, in a case where the malfunction diagnosis of the three-way catalyst 10 is not requested, the execution of this flow ends once. In a case where the determination of S101 is affirmative, next, processing of S102 is executed.

In S102, it is determined whether or not the first air-fuel ratio control is being executed. Specifically, it is determined whether or not the first air-fuel ratio control execution flag stored in the ECU 20 is turned on. In a case where the determination of S102 is affirmative, next, processing of S103 is executed. In S103, a reference catalyst temperature Tcbase of the three-way catalyst 10 at the present time is read. As described above, the reference catalyst temperature Tcbase of the three-way catalyst 10 is constantly estimated by the ECU 20 while the internal combustion engine 1 is being operated.

Next, in S104, it is determined whether or not the reference catalyst temperature Tcbase of the three-way catalyst 10 read in S103 is equal to or higher than the predetermined diagnosis temperature Tcd. As described above, the diagnosis temperature Tcd is determined in advance based on an experiment or the like, and is stored in the ECU 20. In a case where the determination of S104 is negative, that is, in a case where the reference catalyst temperature Tcbase of the three-way catalyst 10 does not reach the diagnosis temperature Tcd, next, processing of S107 is executed. In S107, the first air-fuel ratio control being executed at present is continued. Then, the execution of this flow ends once.

In a case where the determination of S104 is affirmative, next, processing of S105 is executed. In S105, it is determined whether or not the first predetermined period dt1 has elapsed in a state in which the reference catalyst temperature Tcbase of the three-way catalyst 10 is equal to or higher than the diagnosis temperature Tcd. As described above, the first predetermined period dt1 is determined in advance based on an experiment or the like, and is stored in the ECU 20. In a case where the determination of S105 is negative, next, the processing of S107 is executed. That is, the first air-fuel ratio control being executed at present is continued.

In a case where the determination of S105 is affirmative, next, processing of S106 is executed. In S106, the first air-fuel ratio control execution flag is turned off, and the execution of the first air-fuel ratio control is interrupted. Next, processing of S108 is executed. In S108, the second air-fuel ratio control execution flag is turned on, and the second air-fuel ratio control is executed. If the second air-fuel ratio control is executed, the maximum oxygen storage amount of the three-way catalyst 10 is calculated by the above-described method while the second air-fuel ratio control is being executed. The malfunction diagnosis of the three-way catalyst 10 is performed based on the calculated maximum oxygen storage amount.

In a case where the determination of S102 is negative, that is, in a case where the first air-fuel ratio control is not executed when the malfunction diagnosis request flag is turned on, next, processing of S109 and S110 is executed. In S109, the reference catalyst temperature Tcbase of the three-way catalyst 10 at the present time is read. Then, in S110, it is determined whether or not the reference catalyst temperature Tcbase of the three-way catalyst 10 read in S109 is equal to or higher than the diagnosis temperature Tcd. In a case where the determination of S110 is negative, the execution of this flow ends once. In a case where the determination of S110 is affirmative, next, the processing of S108 is executed. That is, the second air-fuel ratio control execution flag is turned on, and the second air-fuel ratio control is executed.

According to the above-described flow, the execution of the first air-fuel ratio control is interrupted after the reference catalyst temperature Tcbase of the three-way catalyst 10 becomes equal to or higher than the diagnosis temperature Tcd, and the second air-fuel ratio control is executed.

As shown in the time chart of FIG. 4 and the flowchart of FIG. 5, in this embodiment, after a state in which the reference catalyst temperature Tcbase of the three-way catalyst 10 is equal to or higher than the diagnosis temperature Tcd is continued for the first predetermined period dt1, the execution of the first air-fuel ratio control is interrupted, and the second air-fuel ratio control is executed. However, such a procedure is not essential. That is, when the reference catalyst temperature Tcbase of the three-way catalyst 10 reaches the diagnosis temperature Tcd, the execution of the first air-fuel ratio control may be interrupted, and the second air-fuel ratio control may be executed. Even in this case, if a state in which the reference catalyst temperature Tcbase of the three-way catalyst 10 is equal to or higher than the diagnosis temperature Tcd is maintained after the execution of the first air-fuel ratio control is interrupted, it is possible to perform the malfunction diagnosis of the three-way catalyst 10.

In this embodiment, the execution of the first air-fuel ratio control is interrupted immediately if the first predetermined period dt1 has elapsed in a state in which the reference catalyst temperature Tcbase of the three-way catalyst 10 is equal to or higher than the diagnosis temperature Tcd, and the execution of the second air-fuel ratio control is started. That is, at the time t4 in FIG. 4, the first air-fuel ratio control execution flag is turned off, and the second air-fuel ratio control execution flag is turned on. However, the execution of the second air-fuel ratio control is not necessarily started simultaneously with when the execution of the first air-fuel ratio control is interrupted.

At the time (the time t4 in FIG. 4) at which the execution of the first air-fuel ratio control is interrupted, the actual temperature of the three-way catalyst 10 becomes higher than the diagnosis temperature Tcd. Then, if the execution of the first air-fuel ratio control is interrupted, the actual temperature of the three-way catalyst 10 starts to decrease. Accordingly, the execution of the second air-fuel ratio control may be started after the actual temperature of the three-way catalyst 10 decreases a temperature near the diagnosis temperature Tcd from the time at which the execution of the first air-fuel ratio control is interrupted. In this case, it is possible to suppress variation in temperature of the three-way catalyst 10 when executing the second air-fuel ratio control for the malfunction diagnosis of the three-way catalyst 10 (that is, the temperature of the three-way catalyst 10 at each time the second air-fuel ratio control is executed easily falls within a range near the diagnosis temperature Tcd.). For this reason, it is possible to improve the accuracy of the malfunction diagnosis of the three-way catalyst 10.

Next, a modification example of this embodiment will be described. In this modification example, in order to perform malfunction diagnosis of the upstream air-fuel ratio sensor 11 or the downstream air-fuel ratio sensor 12, the second air-fuel ratio control is executed when the temperature of the three-way catalyst 10 is equal to or higher than the predetermined diagnosis temperature. In a case where the second air-fuel ratio control is executed, if the upstream air-fuel ratio sensor 11 is in a normal state, the detection value of the upstream air-fuel ratio sensor 11 transits as indicated by the line L2 of FIG. 2 with change in the air-fuel ratio of inflow exhaust gas. If the upstream air-fuel ratio sensor 11 is in a malfunctioning state, the detection value of the upstream air-fuel ratio sensor 11 shows transition different from the line L2 of FIG. 2. In a case where the second air-fuel ratio control is executed, if the downstream air-fuel ratio sensor 12 is in a normal state, the detection value of the downstream air-fuel ratio sensor 12 transits as indicated by the line L3 of FIG. 2 with change in the air-fuel ratio of outflow exhaust gas. If the downstream air-fuel ratio sensor 12 is in a malfunctioning state, the detection value of the downstream air-fuel ratio sensor 12 shows transition different from the line L3 of FIG. 2. Therefore, it is possible to perform the malfunction diagnosis of the respective air-fuel ratio sensors 11, 12 based on a way of transition of the detection values of the air-fuel ratio sensors 11, 12 when the second air-fuel ratio control is executed.

When the second air-fuel ratio control is executed, the characteristics of exhaust gas discharged from the internal combustion engine 1 are likely to be deteriorated compared to a normal time, that is, when the air-fuel ratio of the air-fuel mixture in the cylinder 2 is controlled to near the stoichiometric air-fuel ratio. For this reason, in order to reduce deterioration of the characteristics of exhaust gas discharged into the atmosphere, even in a case of executing the second air-fuel ratio control to perform the malfunction diagnosis of the upstream air-fuel ratio sensor 11 or the downstream air-fuel ratio sensor 12, the three-way catalyst 10 should be sufficiently activated. Even if transition of the air-fuel ratio of inflow exhaust gas is identical, in a state in which the three-way catalyst 10 is not sufficiently activated, to begin with, there is a case transition of the air-fuel ratio of outflow exhaust gas itself is different from that when the three-way catalyst 10 is sufficiently activated. For this reason, in order to perform the malfunction diagnosis of the downstream air-fuel ratio sensor 12 with high accuracy based on a way of transition of the detection value of the downstream air-fuel ratio sensor 12 while the second air-fuel ratio control is being executed, it is necessary to perform the second air-fuel ratio control in a state in which the three-way catalyst 10 is sufficiently activated. Accordingly, when performing the malfunction diagnosis of the upstream air-fuel ratio sensor 11 or the downstream air-fuel ratio sensor 12, similarly to when performing the malfunction diagnosis of the three-way catalyst 10 described above, the second air-fuel ratio control is executed when the temperature of the three-way catalyst 10 is equal to or higher than the diagnosis temperature.

Then, in a case where there is a request for the malfunction diagnosis of the upstream air-fuel ratio sensor 11 or the downstream air-fuel ratio sensor 12 while the first air-fuel ratio control is being executed, as in a case where there is a request for the malfunction diagnosis of the three-way catalyst 10 while the first air-fuel ratio control is being executed, it is necessary to interrupt the first air-fuel ratio control and to execute the second air-fuel ratio control. Accordingly, in this example, in a case where there is a request for the malfunction diagnosis of the upstream air-fuel ratio sensor 11 or the downstream air-fuel ratio sensor 12 while the first air-fuel ratio control is being executed, the ECU 20 interrupts the execution of the first air-fuel ratio control after the reference catalyst temperature of the three-way catalyst 10 becomes equal to or higher than the diagnosis temperature, and executes the second air-fuel ratio control. Accordingly, it is possible to prevent the temperature of the three-way catalyst 10 from decreasing below the diagnosis temperature after the execution of the first air-fuel ratio control is interrupted. For this reason, in a case where there is a request for the malfunction diagnosis of the upstream air-fuel ratio sensor 11 or the downstream air-fuel ratio sensor 12 while the first air-fuel ratio control is being executed, it is possible to more suitably perform the malfunction diagnosis.

Next, the second embodiment will be described. The schematic configuration of an internal combustion engine according to this example and an intake and exhaust system thereof is the same as the configuration according to the first embodiment described above. Even in this example, as in the first embodiment described above, in a case where the predetermined temperature increase condition for increasing the temperature of the three-way catalyst 10 is established, the first air-fuel ratio control is executed. Furthermore, in a case of performing the malfunction diagnosis of the three-way catalyst 10, the second air-fuel ratio control is executed.

In the first embodiment described above, the reference catalyst temperature which is the temperature of the three-way catalyst 10 not including the increase in temperature with the execution of the first air-fuel ratio control is estimated by the ECU 20 while the first air-fuel ratio control is being executed. Then, in a case where there is a request for the malfunction diagnosis of the three-way catalyst 10 while the first air-fuel ratio control is being executed, the ECU 20 interrupts the execution of the first air-fuel ratio control after the estimated reference catalyst temperature becomes equal to or higher than the diagnosis temperature, and executes the second air-fuel ratio control. In contrast, in this embodiment, in a case where there is a request for the malfunction diagnosis of the three-way catalyst 10 while the first air-fuel ratio control is being executed, the ECU 20 interrupts the execution of the first air-fuel ratio control after the temperature (actual temperature) of the three-way catalyst 10 becomes equal to or higher than a predetermined interruption temperature while the first air-fuel ratio control is being executed, and executes the second air-fuel ratio control. The interruption temperature is a temperature higher than the diagnosis temperature. In more detail, the interruption temperature is a temperature at which the temperature of the three-way catalyst 10 is maintained to be equal to or higher than the diagnosis temperature if the temperature of the three-way catalyst 10 is equal to or higher than the interruption temperature while the first air-fuel ratio control is being executed even if the first air-fuel ratio control is interrupted.

As described above, if the execution of the first air-fuel ratio control is interrupted, the temperature of the three-way catalyst 10 decreases. However, if the temperature of the three-way catalyst 10 while the first air-fuel ratio control is being executed is sufficiently high, even in a case where the execution of the first air-fuel ratio control is interrupted and the temperature of the three-way catalyst 10 decreases, the temperature of the three-way catalyst 10 after the execution of the first air-fuel ratio control is interrupted can be maintained to be equal to or higher than the diagnosis temperature. That is, if the temperature of the three-way catalyst 10 while the first air-fuel ratio control is being executed is sufficiently high, it is considered that the reference catalyst temperature of the three-way catalyst 10 becomes equal to or higher than the diagnosis temperature. In this way, the temperature of the three-way catalyst 10 while the first air-fuel ratio control is being executed, at which the temperature of the three-way catalyst 10 is maintained to be equal to or higher than the diagnosis temperature even after the execution of the first air-fuel ratio control is interrupted, is set as the interruption temperature in this embodiment. Such an interruption temperature can be determined in advance based on an experiment or the like.

Figure 6:
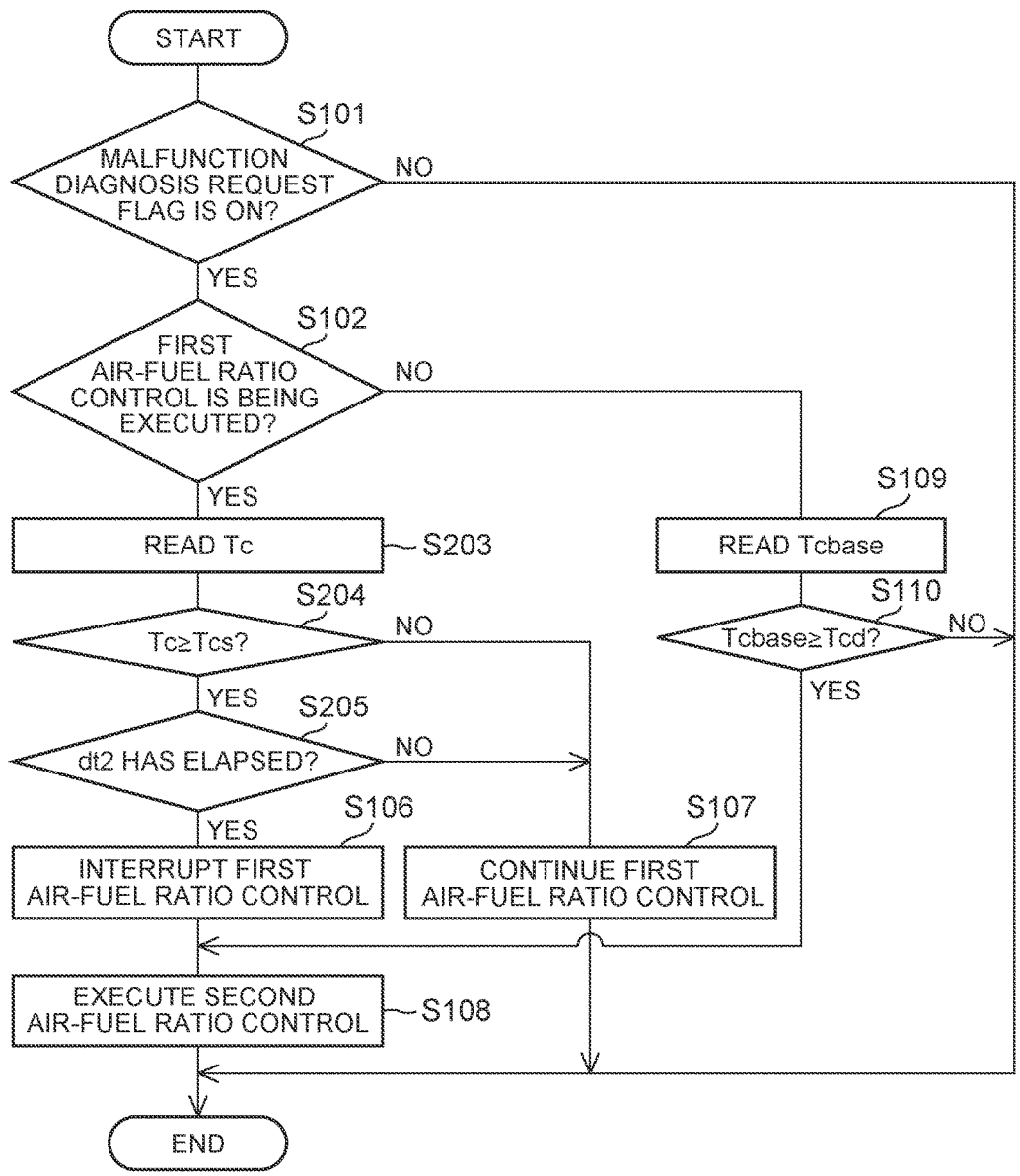
FIG. 6 is a flowchart showing a control flow when executing second air-fuel ratio control according to a second embodiment.

Hereinafter, a control flow when executing the second air-fuel ratio control according to this embodiment will be described based on the flowchart shown in FIG. 6. The flow shown in FIG. 6 is stored in the ECU 20, and is repeatedly executed in a predetermined cycle by the ECU 20 while the internal combustion engine 1 is being operated. The steps in which the same kinds of processing as those in the flow shown in FIG. 5 are performed are represented by the same reference numerals, and description thereof will not be repeated.

In this flow, in a case where the determination of S102 is affirmative, next, processing of S203 is executed. In S203, a temperature Tc of the three-way catalyst 10 at the present time is read. As described above, the actual temperature Tc of the three-way catalyst 10 while the first air-fuel ratio control is being executed is constantly estimated by the ECU 20 while the internal combustion engine 1 is being operated.

Next, in S204, it is determined whether or not the temperature Tc of the three-way catalyst 10 read in S203 is equal to or higher than a predetermined interruption temperature Tcs. As described above, the interruption temperature Tcs is determined in advance based on an experiment or the like, and is stored in the ECU 20. In a case where the determination of S204 is negative, that is, in a case where the temperature Tc of the three-way catalyst 10 does not reach the interruption temperature Tcs, next, the processing of S107 is executed.

In a case where the determination of S204 is affirmative, next, processing of S205 is executed. In S205, it is determined whether or not a second predetermined period dt2 has elapsed in a state in which the temperature Tc of the three-way catalyst 10 is equal to or higher than the interruption temperature Tcs. The second predetermined period dt2 is a period in which it can be determined that the temperature of the three-way catalyst 10 while the first air-fuel ratio control is being executed is stabled and becomes equal to or higher than the diagnosis temperature Tcd. That is, if a state in which the temperature Tc of the three-way catalyst 10 is equal to or higher than the interruption temperature Tcs is continued for the second predetermined period dt2 or longer, it can be determined that the temperature of the three-way catalyst 10 can be stable and maintained to be equal to or higher than the diagnosis temperature even after the execution of the first air-fuel ratio control is interrupted. Such a second predetermined period dt2 is determined in advance based on an experiment or the like, and is stored in the ECU 20. In a case where the determination of S205 is negative, next, the processing of S107 is executed. In a case where the determination of S205 is affirmative, next, the processing of S106 is executed. That, the first air-fuel ratio control execution flag is turned off, and the execution of the first air-fuel ratio control is interrupted.

According to the above-described flow, after the temperature Tc of the three-way catalyst 10 while the first air-fuel ratio control is being executed becomes equal to or higher than the interruption temperature Tcs, the execution of the first air-fuel ratio control is interrupted, and the second air-fuel ratio control is executed. With this, it is possible to prevent the temperature of the three-way catalyst 10 from decreasing below the diagnosis temperature after the execution of the first air-fuel ratio control is interrupted. For this reason, in a case where there is a request for the malfunction diagnosis of the three-way catalyst 10 while the first air-fuel ratio control is being executed, it is possible to more suitably perform the malfunction diagnosis.

As shown in the flowchart of FIG. 6, in this embodiment, after a state in which the temperature Tc of the three-way catalyst 10 is equal to or higher than the interruption temperature Tcs while the first air-fuel ratio control is being executed is continued for the second predetermined period dt2, the execution of the first air-fuel ratio control is interrupted, and the second air-fuel ratio control is executed. However, such a procedure is not essential. That is, when the temperature Tc of the three-way catalyst 10 reaches the interruption temperature Tcs while the first air-fuel ratio control is being executed, the execution of the first air-fuel ratio control may be interrupted, and the second air-fuel ratio control may be executed. Even in this case, if a state in which the reference catalyst temperature Tcbase of the three-way catalyst 10 is equal to or higher than the diagnosis temperature Tcd is maintained after the execution of the first air-fuel ratio control is interrupted, it is possible to perform the malfunction diagnosis of the three-way catalyst 10.

As in the modification example of the first embodiment described above, even in the second embodiment, in a case where there is a request for the malfunction diagnosis of the upstream air-fuel ratio sensor 11 or the downstream air-fuel ratio sensor 12 while the first air-fuel ratio control is being executed, the execution of the first air-fuel ratio control may be interrupted after the temperature of the three-way catalyst 10 becomes equal to or higher than the interruption temperature while the first air-fuel ratio control is being executed, and the second air-fuel ratio control may be executed. Accordingly, it is possible to prevent the temperature of the three-way catalyst 10 from decreasing below the diagnosis temperature after the execution of the first air-fuel ratio control is interrupted. For this reason, as in the modification example of the first embodiment described above, in a case where there is a request for the malfunction diagnosis of the upstream air-fuel ratio sensor 11 or the downstream air-fuel ratio sensor 12 while the first air-fuel ratio control is being executed, it is possible to more suitably execute the malfunction diagnosis.

What is claimed is:

1. An exhaust gas control system for an internal combustion engine having a plurality of cylinders, the exhaust gas control system comprising:
   a three-way catalyst provided in an exhaust passage on a downstream side from a collector of exhaust branch pipes, the exhaust branch pipes being connected to the plurality of cylinders respectively,
   an upstream sensor provided in the exhaust passage on an upstream side from the three-way catalyst, the upstream sensor being configured to detect a physical quantity correlated with an air-fuel ratio of exhaust gas,
   a downstream sensor provided in the exhaust passage on a downstream side from the three-way catalyst, the downstream sensor being configured to detect a physical quantity correlated with the air-fuel ratio of exhaust gas, and
   an electronic control unit configured to:
      execute a first air-fuel ratio control;
      control an air-fuel ratio of an air-fuel mixture in a part of the plurality of cylinders to a lean air-fuel ratio and control an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control, the lean air-fuel ratio being an air-fuel ratio that is leaner than a stoichiometric air-fuel ratio, and the rich air-fuel ratio being an air-fuel ratio that is richer than the stoichiometric air-fuel ratio;
      execute a malfunction diagnosis for diagnosing at least one of the three-way catalyst, the upstream sensor, and the downstream sensor;
      execute a second air-fuel ratio control to perform the malfunction diagnosis;
      switch the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control;
      estimate reference catalyst temperature while the electronic control unit executes the first air-fuel ratio control, the reference catalyst temperature being the temperature of the three-way catalyst not including an increase in temperature with the execution of the first air-fuel ratio control; and
      perform the malfunction diagnosis by executing the second air-fuel ratio control in response to when the electronic control unit interrupts the execution of the first air-fuel ratio control after the estimated reference catalyst temperature becomes equal to or higher than the diagnosis temperature while the first air-fuel ratio control is being executed.

2. The exhaust gas control system according to claim 1, wherein the electronic control unit is configured to perform the malfunction diagnosis by executing the second air-fuel ratio control in response to when the electronic control unit interrupts the execution of the first air-fuel ratio control after a state in which the estimated reference catalyst temperature is equal to or higher than the diagnosis temperature is continued for a first predetermined period or longer.

3. An exhaust gas control system for an internal combustion engine having a plurality of cylinders, the exhaust gas control system comprising:
a three-way catalyst provided in an exhaust passage on a downstream side from a collector of exhaust branch pipes, the exhaust branch pipes being connected to the plurality of cylinders respectively,
an upstream sensor provided in the exhaust passage on an upstream side from the three-way catalyst, the upstream sensor being configured to detect a physical quantity correlated with an air-fuel ratio of exhaust gas,
a downstream sensor provided in the exhaust passage on a downstream side from the three-way catalyst, the downstream sensor being configured to detect a physical quantity correlated with the air-fuel ratio of exhaust gas; and
an electronic control unit configured to:
execute a first air-fuel ratio control;
control an air-fuel ratio of an air-fuel mixture in a part of the plurality of cylinders to a lean air-fuel ratio and control an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control, the lean air-fuel ratio being an air-fuel ratio that is leaner than a stoichiometric air-fuel ratio, and the rich air-fuel ratio being an air-fuel ratio that is richer than the stoichiometric air-fuel ratio;
execute a malfunction diagnosis for diagnosing at least one of the three-way catalyst, the upstream sensor, and the downstream sensor;
execute a second air-fuel ratio control to perform the malfunction diagnosis;
switch the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control; and
perform the malfunction diagnosis by executing the second air-fuel ratio control in response to when the electronic control unit interrupts the execution of the first air-fuel ratio control after the temperature of the three-way catalyst becomes equal to or higher than a predetermined interruption temperature while the first air-fuel ratio control is being executed, the interruption temperature being a temperature higher than the diagnosis temperature and a temperature at which the temperature of the three-way catalyst is maintained to be equal to or higher than the diagnosis temperature even when the electronic control unit interrupts the execution of the first air-fuel ratio control.

4. The exhaust gas control system according to claim 3, wherein the electronic control unit is configured to perform the malfunction diagnosis by executing the second air-fuel ratio control in response to when the electronic control unit interrupts the execution of the first air-fuel ratio control after a state in which the temperature of the three-way catalyst is equal to or higher than the interruption temperature while the first air-fuel ratio control is being executed is continued for a second predetermined period or longer.

5. A control method for an internal combustion engine, the internal combustion engine including a plurality of cylinders and provided with an exhaust gas control system, the exhaust gas control system including a three-way catalyst, an upstream sensor, a downstream sensor, and an electronic control unit,
the three-way catalyst being provided in an exhaust passage on a downstream side from a collector of exhaust branch pipes, the exhaust branch pipes being connected to the plurality of cylinders respectively,
the upstream sensor being provided in the exhaust passage on an upstream side from the three-way catalyst, and the upstream sensor being configured to detect a physical quantity correlated with an air-fuel ratio of exhaust gas, and
the downstream sensor being provided in the exhaust passage on a downstream side from the three-way catalyst, and the downstream sensor being configured to detect a physical quantity correlated with the air-fuel ratio of exhaust gas,
the control method comprising:
executing, by the electronic control unit, a first air-fuel ratio control;
controlling, by the electronic control unit, an air-fuel ratio of an air-fuel mixture in a part of the plurality of cylinders to a lean air-fuel ratio and controlling, by the electronic control unit, an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control, the lean air-fuel ratio being an air-fuel ratio that is leaner than a stoichiometric air-fuel ratio, and the rich air-fuel ratio being an air-fuel ratio that is richer than the stoichiometric air-fuel ratio;
performing, by the electronic control unit, a malfunction diagnosis for diagnosing at least one of the three-way catalyst, the upstream sensor, and the downstream sensor;
executing, by the electronic control unit, a second air-fuel ratio control to perform the malfunction diagnosis;
switching, by the electronic control unit, the air-fuel ratio of the air-fuel mixture in all of the plurality of cylinders between the lean air-fuel ratio and the rich air-fuel ratio, when the temperature of the three-way catalyst is equal to or higher than a predetermined diagnosis temperature in the second air-fuel ratio control;
estimating, by the electronic control unit, reference catalyst temperature while the electronic control unit executes the first air-fuel ratio control, the reference catalyst temperature being the temperature of the three-way catalyst not including an increase in temperature with the execution of the first air-fuel ratio control; and
performing, by the electronic control unit, the malfunction diagnosis by executing the second air-fuel ratio control in response to when the electronic control unit interrupts the execution of the first air-fuel ratio control after the estimated reference catalyst temperature becomes equal to or higher than the diagnosis temperature while the first air-fuel ratio control is being executed.

6. A control method for an internal combustion engine, the internal combustion engine including a plurality of cylinders and provided with an exhaust gas control system, the exhaust gas control system including a three-way catalyst, an upstream sensor, a downstream sensor, and an electronic control unit, the three-way catalyst being provided in an exhaust passage on a downstream side from a collector of exhaust branch pipes, the exhaust branch pipes being connected to the plurality of cylinders respectively, the upstream sensor being provided in the exhaust passage on an upstream side from the three-way catalyst, and the upstream sensor being configured to detect a physical quantity correlated with an air-fuel ratio of exhaust gas, and the downstream sensor being provided in the exhaust passage on a downstream side from the three-way catalyst, and the downstream sensor being configured to detect a physical quantity correlated with the air-fuel ratio of exhaust gas, the control method comprising:

executing, by the electronic control unit, a first air-fuel ratio control;

controlling, by the electronic control unit, an air-fuel ratio of an air-fuel mixture in a part of the plurality of cylinders to a lean air-fuel ratio and controlling, by the electronic control unit, an air-fuel ratio of an air-fuel mixture in the other part of the plurality of cylinders to a rich air-fuel ratio when the electronic control unit determines that a predetermined temperature increase condition for increasing the temperature of the three-way catalyst is established in the first air-fuel ratio control, the lean air-fuel ratio being an air-fuel ratio that is leaner than a stoichiometric air-fuel ratio, and the rich air-fuel ratio being an air-fuel ratio that is richer than the stoichiometric air-fuel ratio;

performing, by the electronic control unit, a malfunction diagnosis for diagnosing at least one of the three-way catalyst, the upstream sensor, and the downstream sensor;

executing, by the electronic control unit, a second air-fuel ratio control to perform the malfunction diagnosis;

switching, by the electronic control unit, the air-fuel ratio of the air-fuel mixture in all of the plurality of cylinders between the lean air-fuel ratio and the rich air-fuel ratio when the temperature of the three-way catalyst is equal to or higher than a predetermined diagnosis temperature in the second air-fuel ratio control; and performing, by the electronic control unit, the malfunction diagnosis by executing the second air-fuel ratio control in response to when the electronic control unit interrupts the execution of the first air-fuel ratio control after the temperature of the three-way catalyst becomes equal to or higher than a predetermined interruption temperature while the first air-fuel ratio control is being executed, the interruption temperature being a temperature higher than the diagnosis temperature and a temperature at which the temperature of the three-way catalyst is maintained to be equal to or higher than the diagnosis temperature even when the electronic control unit interrupts the execution of the first air-fuel ratio control.

* * * * *